United States Patent [19]

Inoue et al.

[11] Patent Number: 4,551,602
[45] Date of Patent: Nov. 5, 1985

[54] ELECTRICAL MACHINING USING AN AQUEOUS SOLUTION WITH A RECYCLED SURFACE ACTIVE AGENT

[75] Inventors: Kiyoshi Inoue, Tokyo; Makoto Onoue; Sadao Sano, both of Yokohamashi, all of Japan

[73] Assignee: Inoue-Japax Research Incorporated, Kanagawaken, Japan

[21] Appl. No.: 506,448

[22] Filed: Jun. 21, 1983

[30] Foreign Application Priority Data

Jun. 23, 1982 [JP] Japan ................................ 57-108942
Jul. 8, 1982 [JP] Japan ................................ 57-119105

[51] Int. Cl.[4] ........................ B01D 17/00; B23P 1/16
[52] U.S. Cl. ........................... 219/69 D; 204/129.75; 210/223; 210/695; 210/711; 210/712; 210/737
[58] Field of Search ................ 219/69 D, 69 M; 204/129.75; 210/695, 711, 712, 737, 774, 806, 167, 223

[56] References Cited

U.S. PATENT DOCUMENTS

| | | | |
|---|---|---|---|
| 3,469,057 | 9/1969 | Maines ............................ | 219/69 D |
| 3,477,948 | 11/1969 | Inoue .............................. | 219/69 D |
| 3,657,119 | 4/1972 | Turbeville ...................... | 210/695 |
| 4,002,562 | 1/1977 | Ames et al. .................... | 210/806 |
| 4,057,495 | 11/1977 | Kinoshita et al. ............. | 210/712 |
| 4,375,588 | 3/1983 | Frei ................................. | 219/69 D |

FOREIGN PATENT DOCUMENTS

| | | | |
|---|---|---|---|
| 52-56492 | 5/1977 | Japan .............................. | 219/69 D |
| 53-17579 | 2/1978 | Japan .............................. | 210/695 |
| 54-34197 | 3/1979 | Japan .............................. | 219/69 D |
| 55-18523 | 5/1980 | Japan .............................. | 210/695 |
| 56-45331 | 4/1981 | Japan .............................. | 219/69 D |
| 586926 | 1/1978 | U.S.S.R. ........................ | 210/223 |
| 682347 | 8/1979 | U.S.S.R. ........................ | 219/69 D |
| 728888 | 4/1980 | U.S.S.R. ........................ | 210/223 |

*Primary Examiner*—Roy N. Envall, Jr.
*Assistant Examiner*—Geoffrey S. Evans
*Attorney, Agent, or Firm*—Karl F. Ross; Herbert Dubno

[57] ABSTRACT

An electrical machining system utilizing a machining liquid consisting at least in a major part of an aqueous solution containing a deionized water and a surface active agent dissolved therein, the latter having a temperature-dependent solubility in the solution and a cloud point, i.e. a temperature below which it remains dissolved therein. The machining liquid is supplied into a machining zone which produces a liquid effluent in which machining products are entrapped. The liquid effluent is fed to a separation zone where it is heated at a temperature above its cloud point to separate out an amount of the surface active agent and to collect that amount substantially in a solid form while forming a liquid output constituted by a remainder of the liquid effluent. The surface active agent is collected by deposition on a carrier material, e.g. iron particles. When iron particles are used, an electromagnet may be employed to decrease the time necessary to recover the surface active agent. The carrier material having the deposit of the surface active agent may be brought into contact with a cool deionized water to form a solution of the collected surface active agent therein.

27 Claims, 3 Drawing Figures

ELECTRICAL MACHINING USING AN AQUEOUS SOLUTION WITH A RECYCLED SURFACE ACTIVE AGENT

FIELD OF THE INVENTION

The present invention relates to an electrical machining system involving the processing of a machining liquid and a method of processing a machining liquid in an electrical machining system.

BACKGROUND OF THE INVENTION

In the field of electrical machining the machining fluid has been recognized to be extremely important. In electrical discharge machining (EDM), for example, two sorts of the machining fluid have been currently in use. Thus, in the ram-type EDM used for drilling or cavity-sinking, a hydrocarbon liquid (oil) such as kerosene (paraffin) or transformer oil has been commonly used. In the wire-cut or traveling-wire EDM, it has been common to use a water liquid and, especially, distilled water.

Kerosene has advantageously been used in the ram-type EDM not only for its non-corrosiveness but for its superiority in removal rate capability to water in general and its uniform usefulness over the extensive ranges of machining setting conditions, viz. from a finish range which enables a finer surface finish to be achieved at the expense of removal rate to a roughing range which enables a higher removal rate to be achieved at the expense of surface finish. Furthermore, kerosene is available at a relatively reasonable price and has a relatively long service life. In addition, it can be processed relatively readily for disposal and gives rise to no particular pollution problem when treated properly, although kerosene, like other hydrocarbon liquids, tends to roughen the operator's skin.

Kerosene and other hydrocarbons such as transformer oil are, however, dangerously disadvantageous in that they are inflammable. In the course of a machining operation, when the surface of the hydrocarbon machining liquid in which the tool electrode and the workpiece are spacedly juxtaposed to define a machining gap happens to drop so that the separation of the gap from air (oxygen) is broken, the hydrocarbon liquid in the gap can be ignited by the electrical discharges, thus causing a fire. Thus, extreme care must be exercised by the operator throughout the machining operation vis a vis the inflammability of the machining liquid and a fire extinguisher must be provided. It must also be noted that kerosene for this reason cannot be used in those traveling-wire EDM operations in which the machining gap is defined in air.

On the other hand, water is advantageous in that it is entirely free from the danger of fire, is available at a very reasonable cost, presents no hazard to the operator's skin and is readily processable for disposal or recycling. Water is, however, highly disadvantageous in that it is inferior in removal rate capabilities, especially in medium and roughing ranges. When the existing water liquid is used in these ranges, machining becomes difficult or cannot be performed at a reasonable removal rate. In addition, water can in general not be used in a "no wear" or "low wear" machining mode. For these reasons, it is the state of the art that water has found its use almost exclusively in the traveling-wire EDM, in spite of its definite disadvantages as mentioned above.

In discussing the conventional use of electrical machining fluids, it should also be mentioned that the use of an aqueous solution has been generally known. Thus, in electrochemical machining (ECM) and electrochemical-discharge machining (ECDM), it is commonly required to use an aqueous solution of an electrolyte since these processes commonly entail at least in part the electrolytic dissolution of material from the workpiece. In the field of EDM, there has been a proposal to use an aqueous solution of a certain organic substance. For example, U.S. Pat. No. 3,168,638 to M. J. RIDDLES and U.S. Pat. No. 3,334,210 disclose aqueous solutions containing polyethylene glycol which are claimed to allow an increased "metal removal efficiency" to be achieved. Further, a conventional rust inhibitor may be added to each of these machining fluids. Unfortunately, however, these proposed EDM fluids have not been put into practical use. First of all, these fluids are relatively costly and not available at a reasonable price. Secondly, the machining results, all in terms of removal rate, relative electrode wear and surface finish, obtainable with these fluids are still much inferior to those achieved with a hydrocarbon such as kerosene. Evidently, this is due to the fact that discharge efficiency is still very deficient compared with that achieved with the hydrocarbon liquid. We have recognized that the discharge decomposition products from these fluids in the machining gap are, in major part, a hydroxide and carbonyl base which tend to substantially reduce the resistance of the machining gap so that the discharge efficiency of the machining process remains unsatisfactory.

It has now been discovered that a water-based machining liquid, when it contains an additional component in the form of a surface active agent such as a silicone oil, suffers less drop in its resistance and permits electrical machining current, e.g. in the form of successive electrical discharges, to proceed with increased efficiency. Sometimes it is also desirable that the water-based liquid include a further additional amount of a liquid hydrocarbon to improve electrical machining performance and discharge stability. When the liquid hydrocarbon is added together with a surface active agent to the water, it can be present in a highly uniform emulsified state in the solution.

In an electrical machining system utilizing such an improved, highly favorable solution, however, it has been found that problems arise when an attempt to recycle one or more components thereof is made. While water and a liquid hydrocarbon are relatively cheap, the surface active agent is of considerable expense. The effluent drained from the electrical machining zone contains machining products, e.g. chips and/or sludge, entrapped in suspension in residual amounts of deionized water and surface active agents. It has been found that machining chips contain extremely fine metal particles, e.g. of a particle size of micron order, which are firmly trapped in the solution. It has thus been found to be extremely difficult to recover these machining products from the machining liquid effluent which consists basically of a highly homogeneous solution of the surface active agent with a deionized water and to recover the surface active agent from the water-based effluent containing these machining products. The difficulty is increased further when the liquid contains a hydrocarbon. Conventional filtration and separation techniques hitherto employed in the art are of little help in overcoming these difficulties.

OBJECTS OF THE INVENTION

The present invention, therefore, seeks to provide an improved method of processing a machining liquid in an electrical machining system, which method enables a substantial amount of the surface active agent to be readily recovered from the machining liquid effluent for recycling, further permitting other components therein to be adequately recycled as well; it is also an object to provide an electrical machining system which affords improved machining efficiency by virtue of the use of a machining liquid containing a surface active agent and which is capable of recovering the surface active agent and recycling components of the liquid effluent which is drained off the electrical machining zone.

SUMMARY OF THE INVENTION

In accordance with the present invention there is provided, in a first aspect thereof, a method of processing a machining liquid in an electrical machining system, which method comprises the steps of: (a) forming an input machining liquid consisting at least in a major part of an aqueous solution containing a surface active agent dissolved in a deionized water, the said surface active agent having a temperature-dependent solubility in the solution and a cloud point of temperature below which it remains dissolved therein; (b) supplying the input machining liquid to an electrical machining zone whereby at least a portion of the supplied liquid serves as a medium for an electrical machining action therein; (c) feeding a liquid effluent from the electrical machining zone, constituted by residual portions of the deionized water the surface active agent remaining in the solution having electrical machining products entrapped therein, into a separation zone; and (d) in the separation zone, heating the liquid effluent to and maintaining it at a temperature sufficiently above the aforesaid cloud point thereof to separate therefrom the said surface active agent and accummulate it substantially in a solid form while forming a liquid constituted by the remainder of said liquid effluent.

Preferably, the liquid effluent from the electrical machining zone is, prior to feeding in step (c) to the separation zone, subjected to a sedimentation step to allow at least a portion of the said machining products to settle, e.g. by gravity.

Preferably, the liquid effluent is agitated while being heated in step (d). The surface active agent can be collected in step (d) and (e) substantially in solid form on a carrier material which may be in the form of a mesh screen or a mass of discrete solid particles.

The method advantageously further comprises the steps of collecting the carrier material having the surface active agent deposited thereon and bringing the collected carrier material into contact with a deionized water to dissolve the collected surface active agent therein to form a solution thereof. The solution can be recycled at least as a portion of the input machining liquid into the electrical machining zone.

The surface active agent may, more generally, be an organic or semi-organic substance having a cloud point as described. The organic or semi-organic substance may contain an element which upon decomposition of the liquid by an electrical machining discharge is capable of producing an oxide thereof. It has been found that the machining liquid when so composed suffers less drop in its resistance even after traversing the electrical machining gap, thus permitting electrical machining discharges to proceed with increased efficiency. The organic substance described should have a component having a chemical bond which is expressed by one of the following chemical formula:

  (1)

  (2)

and

  (3)

or is a derivative of any of them. Thus, when the organic substance contains the component (1) or (3) or a derivative of either thereof, the machining fluid upon discharge decomposition produces silicon oxide ($SiO_2$). When the organic substance contains the component (2) or a derivative thereof, the machining fluid upon discharge decomposition produces titanium oxide ($TiO_2$). One specific exemplary or preferred such organic substance is a silicone oil.

A typical machining liquid in the method of this invention consists 0.1 to 5% by weight of a water-soluble silicone oil and the balance essentially deionized water. Specifically, the silicone oil should preferably be one which is or is usable as, a non-ionic surface active agent, or a denaturated silicone oil. The latter is preferably a polyether denaturated silicone oil.

The machining liquid is advantageously employed, in accordance with a further feature of the invention, with an electrical discharge machining (EDM) method which comprises the steps of: juxtaposing a tool electrode with the workpiece to define a machining gap therebetween in atmospheric air; supplying a machining liquid into the gap and permitting the liquid to pass out of the gap directly into the atmospheric air without immersing the workpiece in the liquid; applying a succession of electrical machining pulses across the tool electrode and the workpiece to produce a succession of electrical discharges through the gap in the presence of the machining liquid, thereby electroerosively removing material from the workpiece at least in part by the electrical discharges; and relatively displacing the tool electrode and the workpiece while maintaining the machining gap substantially constant to advance the material removal in the workpiece.

Since the machining liquid is basically water-based and consists in its substantial or major portion of water according to the invention, there is practically no danger of fire even though the machining gap is defined in the atmospheric air. Furthermore, locating of the machining gap in the atmospheric air has been found to be advantageous to further enhance the discharge efficiency. When the machining gap is defined in the atmospheric air without immersing the workpiece in the machining fluid, there is no overcooling of the machining site as encountered when the workpiece is immersed in the water. Thus, the tool electrode and the workpiece are held effectively at a relatively high temperature of 70° to 80° C. This allows practically each applied electrical pulse to result in a corresponding electrical discharge without fail, thus increasing the discharge efficiency. In the EDM method described, the tool electrode should preferably be composed of graphite, or a sintered graphite-metal composite material. The organic or semi-organic substance may here again be a silicone oil having a siloxene bond (—Si—O—Si—O). The silicone oil is preferably a polyether denaturated silicone oil but any other denaturated silicone oil such as olefin denaturated silicone oil, amino denaturated silicon oil or alcohol denaturated silicone oil may be used. Other than a silicone oil, a sorbitan material such as sorbitanmonolaurate or polyoxethylsorbitanmonolaurate may also be used.

For EDM or ECDM processes, the machining liquid should further incorporate in a desired proportion an electrolyte such as sodium chloride, sodium nitrate, sodium nitrite, potassium nitrate, potassium nitrite, sodium carbonate or sodium hydroxide as conventionally used in these processes.

A water-soluble silicone oil used to embody the present invention such as polyether denaturated silicone oil has a surface tension of 25 to 30 dyne/cm, when contained in a weight proportion of 1% in water and 21 to 31 dyne/cm when contained at a weight proportion of 5% in water. Its specific gravity is 1.00 to 1.10 (at 25° C.) and its refractive index is 1.420 to 1.460 (at 25° C). It has a viscosity of 100 to several tens of thousands CS (at 25° C). When contained at a proportion of 10% by weight in water, it has a cloud point of 100° C. When contained at a proportion less than 10% by weight in water, it has a cloud point less than 100° C. The silicone oil should preferably be one having a viscosity (dynamic) on the order of 100 CS or 1000 CS and a cloud point around 100° C. or less.

The invention also provides, in a second aspect thereof, an electrical machining system which includes means for forming an input machining liquid consisting at least in a major part of an aqueous solution containing a surface active agent dissolved in a deionized water, the surface active agent having a temperature-dependent solubility in the solution and a cloud point of temperature below which it remains dissolved therein; means for supplying the machining liquid to an electrical machining zone whereby at least a portion of the supplied liquid serves as a medium for an electrical machining action therein; means for feeding a liquid effluent from the machining zone, constituted by residual portions of the deionized water and the surface active agent in the solution having electrical machining products therein, into a separation zone; and means disposed in the separation zone for heating the liquid effluent to, and maintaining it at, a temperature above a said cloud point thereof to separate therefrom an amount of the surface active agent substantially in a solid form while forming a liquid constituted by a reminder of the liquid effluent.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Figure 1:
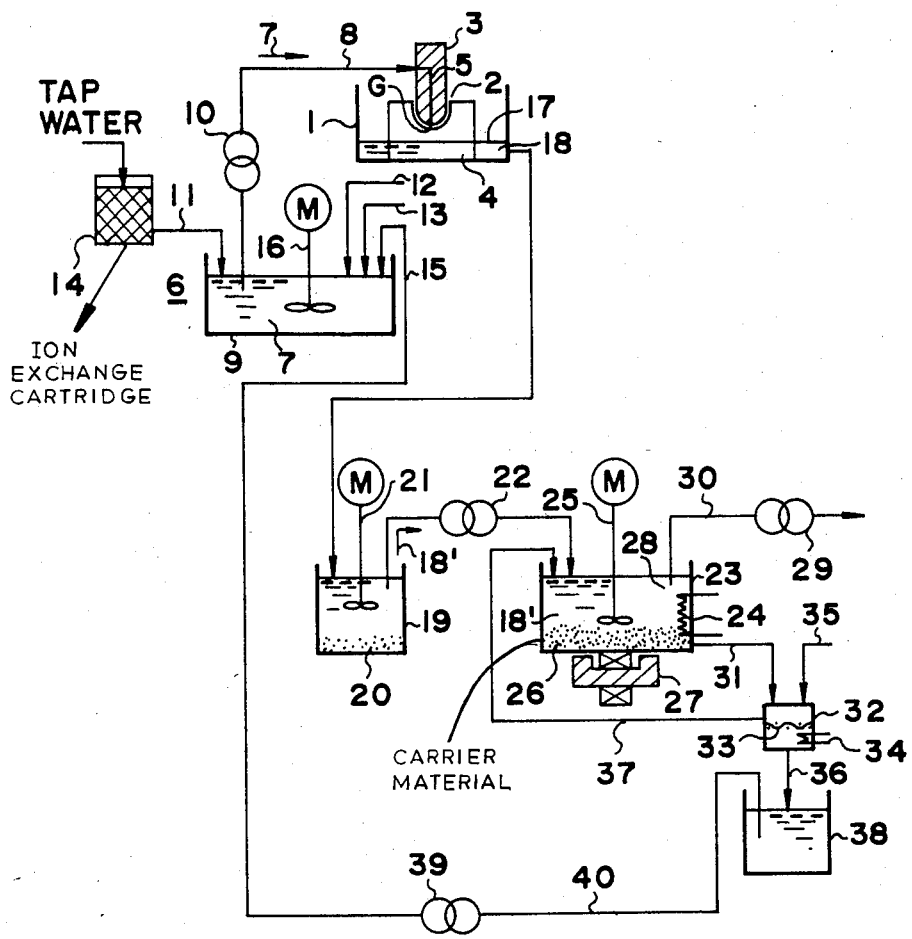
FIG. 1 is a schematic view diagrammatically illustrating an exemplary embodiment of the present invention.

In to FIG. 1 there is shown an electrical machining system embodying the present invention. The system includes a worktank 1 defining a machining zone 2 therein in which a tool electrode 3 is spacedly juxtaposed with a workpiece 4 across a machining gap G. The workpiece 4 is securely positioned in the worktank 1, and the tool electrode 3 is here a shaped electrode designed to machine, as shown, a cavity complementary thereto in the workpiece 4. The tool electrode, however, may be of any other form, e.g. a wire electrode for executing a traveling-wire electrical machining process.

The tool electrode 3 in the illustrated arrangement is thus designed to execute a cavity-sinking operation and, as is typical, is formed with an internal bore 5 open to the machining gap G and communicating with a source 6 of a machining liquid 7 via an inlet conduit 8 to supply the machining liquid into the gap G. An electrical machining current is passed from a power supply (not shown) between the tool electrode 3 and the workpiece 4 to electroerosively remove material from the workpiece 4. As material removal proceeds, the tool electrode is advanced into the workpiece 4 by feed drive means (not shown) to progressvely machine the cavity therein.

The machining liquid source 6 shown comprises a reservoir 9 for retaining the machining liquid 7 which is drawn by a pump 10 into the conduit 8. In accordance with the present invention, the machining liquid 7 to serve as a machining medium for the electroerosive machining action in the machining gap G consists at least in a major part of an aqueous solution containing, as a base component, a deionized water of a specific resistance ranging between $10^3$ to $10^6$ ohm-cm and, as an additional component, a surface active agent dissolved therein. The surface active agent for use in the present invention should have a temperature-dependent solutibility in the solution and a cloud point, i.e. a temperature below which it remains dissolved in the solution, and may be a polyethylene glycol type non-ionic surface active agent, one of a lauric alcohol or nonyl phenol family incorporating ethyleneoxide, one of a silicone oil family, or one of an alkyl phenol family. The surface active agent may be contained at a proportion ranging between 0.1 and 15% by weight, preferably up to 5% by weight in the solution. It has been found that such a surface active agent when added does not materially reduce the desired resistivity of the deionized water base machining liquid and does increase machining electrical current or discharge efficiency.

The machining liquid may additionally incorporate a liquid hydrocarbon such as kerosene, transformer oil or spindle oil in order to further enhance machining performance or discharge stabilization, and to minimize electrode wear. The liquid hydrocarbon may be contained in the machining liquid at a proportion of less than 10% by weight and, preferably, between 1 and 5% by weight. It has also been found that if the machining liquid contains a surface active agent as described, the liquid hydrocarbon can be present in a highly uniform emulsified state in the machining liquid.

In the illustrated arrangement, the machining liquid 7 is formed in the reservoir 9. A deionized water of a preselected specific resistance can be introduced through a conduit 11, the surface active agent through a conduit 12 and the liquid hydrocarbon through a conduit 13. The conduit 11 can be led from a municipal water tap via an ion-exchange cartridge 14 which deionizes the tap water so as to have the desired specific resistance. The reservoir 9 is provided with an additional inlet 15 for receiving a recycling solution as will be described. A further inlet conduit may be provided to introduce into the reservoir 9 one or more electrolytes when an electrochemical machining (ECM) or electrochemical discharge machining (ECDM) process is to be carried out in the machining zone 2. An agitator 16 is also provided to thoroughly blend the liquid components to form the machining liquid 7.

In a sinking-type EDM (electrical discharge machining) process the workpiece 4 and hence the machining zone 2 in the worktank 1 may, as is commonly the case, be fully immersed in the machining liquid supplied from the source 6 so that the surface 17 of the liquid within the worktank 1 remains located well above the upper surface of the workpiece 4 and hence well above the machining gap G throughout a given EDM operation. This mode of EDM process will be called "immersion type" EDM mode.

It is, however, preferable in accordance with one feature of the invention that as shown, the machining gap G be disposed in an open space or air atmosphere, substantially without immersing the workpiece 4 in the body of the liquid within the worktank 1, thus enabling the machining liquid 7 supplied under pressure from the source 6 into and through the machining gap G to be ejected directly into the atmospheric air and the open space within the worktank 1. Sometimes it is also desirable that a relatively static body of the liquid be provided having its upper surface located slightly above or nearly at the upper surface of the workpiece 4. Such modes of EDM process will be called "open space" EDM mode.

Machining liquids as described previously, for use in the method and system according to the present invention give rise to improved results as can be demonstrated in the following example:

A S55C (Japanese Industrial Standard) steel workpiece was EDMed using a copper electrode of a diameter of 30 mm and using various machining liquids A-G. EDM pulses had a pulse duration $\tau on$ of $60\mu$ seconds, a pulse interval $\tau off$ of $20\mu$ seconds and a pulse peak current of 45 amperes. Liquid A was water deionized to have a specific resistance of $0.5 \times 10^4$ ohm-cm, liquid B consisted of 80% by weight polyethylene glycol and the balance water equivalent to the liquid A, and liquid C was kerosene. Liquids D-G consisted of base water equivalent to liquid A and a surface active agent dissolved therein at various proportions, the surface active agent being a polyether denaturated silicone oil which has a viscosity of 1600 CS (at 25° C.), a specific gravity of 1.03 (at 25° C.) and a refractive index of 1.446 (at 25° C.). Liquid D contained the silicone oil at 0.2%, liquid E at 0.5%, F at 1.0% and G at 2.0%, all by weight. Machining results obtained with each of these machining liquids are shown in Table 1 below.

TABLE 1

| Machining Results | Machining Liquid | | | | | | |
|---|---|---|---|---|---|---|---|
| | A | B | C | D | E | F | G |
| Removal Rate (gram/min) | 0.5 | 0.85 | 1.15 | 0.8 (0.9) | 0.95 (1.1) | 1.1 (1.25) | 1.2 (1.4) |
| Relative Electrode Wear E/W (% by weight) | 88 | 60 | 12 | 35 (35) | 28 (30) | 20 (22) | 14 (15) |
| Surface Roughness (3R max) | 65 | 60 | 50 | 60 (60) | 60 (55) | 55 (50) | 55 (50) |

In the table, the numerals not parenthesized are the respective values obtained in an "immersion-type" EDM mode as described and the numerals parenthesized are the respective values obtained in an "open-space" EDM mode as described.

Referring back to FIG. 1, a machining liquid effluent from the machining zone 2 is shown at 18 and has entrapped therein machining products, e.g. EDM products, containing chips, sludges and decomposed gases. The liquid effluent 18 collected in the worktank 1 is drained off into a sedimentation tank 19 where relatively massive and heavy solid components are separated from the liquid effluent and allowed to settle at the bottom of the tank 19 as shown at 20. An agitator 21 is provided to facilitate the separation and sedimentation.

A clarified liquid 18' thus formed to an upper layer of the liquid 18 in the sedimentation tank 19 is then drawn by a pump 22 into a separation tank 23. The liquid 18' in the tank 23, is heated by a heater 24 at a temperature above the cloud point thereof to separate therefrom the surface active agent substantially in a solid form while forming an purified water liquid. To facilitate the separation, the liquid 18' is agitated by an agitator 25, and a carrier material is introduced into the separation tank 24. The carrier material may be a continuous body such as a belt or mesh screen, but is preferably in the form of discrete bodies, e.g. fine particles, in a mass designated at 26. Fine ferrous particles of an average particle size ranging between 0.1 and 20 microns have been found to be highly suitable. These ferrous particles can be partly or wholly provided by fine chips which are formed when the workpiece 4 is a ferrous material and thus entrapped in the liquid effluent 18 and still remaining in the clarified water 18'. The other materials suitable to compose the carrier include other metallic, or non-metallic materials. The other metallic materials include copper, nickel and zinc and the non-metallic materials include ceramics and graphite. Particles of such a carrier material can be added in the reservoir 9 so that they can be entrained in a supply of the machining liquid supplied into the machining gap G or zone 2.

In the presence of a carrier material 26 as described, the surface active agent added in the input machining liquid 7 and existent in the liquid effluent 18, 18' tends to deposit on the material 26 in a solid form, thus separating the liquid which is basically composed of the deionized water. The carrier material 26 should preferably be present in the the liquid 18' within the tank 23 in a proportion of 0.1 to 10% by weight.

Iron particles of a particle size described are magnetic and can be used in conjunction with an external magnetic field, direct or alternating, to facilitate the separation of the surface active agent from the water-based solution. To this end, a magnetic-field generator 27, e.g. an electromagnet, is provided to apply a DC or AC magnetic field to the material 26.

For example, an input machining liquid 7 may consist of 1% by weight an non-ionic, silicone oil, 1% by weight a spindle oil and the balance water which has been deionized to have a specific resistance of $10^5$ ohm-cm. A machining liquid effluent 18' from the machining zone 2, which consists of residual portions of these components and fine ferrous machining chips entrapped therein, may have, in the separation tank 23, added thereto 1% by weight nonyl phenol incorporating at 12 mols ethyleneoxide and 15% by weight iron particles of a particle size of 5 microns. When the resultant liquid, while being agitated by the agitator 25, is heated to a temperature of 65° C., the surface active agent tend to deposit on the iron particles and the ferrous machining chips, separating from a liquid component of the deionized water and the oil. After a settling period of 3 hours subsequent to terminating the agitation, the particles and chips are rinsed by a cooled pure water to form a solution having the deposited surface active agent dissolve therein. The examination of the solution shows that approximately 96% of the surface active agent contained in the machining liquid effluent is recovered. When an alternating magnetic field of 1100 Gauss at a frequency of 50 Hz is applied to the carrier material 26 during the separation process, it is shown that 99.5% of the surface active agent is recovered in a period of 35 minutes. The use of a DC magnetic field shows a recovery of 98% of the surface active agent in the same period.

In another example, an input machining liquid 7 having a specific resistance of $2.0 \times 10^5$ ohm-cm is obtained by adding 1% by weight a silicone oil, 1% by weight kerosene and 1% by weight iron particles of a particle size of 15 microns. The machining liquid after traversing an EDM gap results in a machining liquid effluent 18 having a specific resistance of $5 \times 10^4$ ohm-cm. The effluent liquid having incorporated therein an additional amount of iron particles in the separation tank 23 is heated to a temperature of 80° C. while being thoroughly agitated in a magnetic field of 2000 Gauss to allow the surface active agent to be deposited on the iron particles, separating from a liquid of the deionized water and kerosene. It is found that the liquid has a specific resistance of $4 \times 10^4$ ohm-cm.

It should be noted that the carrier material may also be a dielectric material such as a synthetic resin, e.g. in the form of particles to electrostatically facilitate the separation process. In this case, means is provided for applying a DC or AC electrical field to the material 26.

In a further arrangement of FIG. 1, a clarified liquid 28 collected at an upper part of the liquid 18' in the separation tank 23 is drawn by a pump 29 into a conduit 30 for disposal or further treatment. On the other hand, the particles of carrier material 26 having the surface active agent collected thereon may be transferred via a conduit 31 into a rinsing tank 32 provided with a mesh screen 33 therein and equipped with a cooler 34. The tank 32 is traversed by a pure water 35 of a specified resistivity to cool the material 26 therein, forming an outgoing solution 36 having the collected surface active agent dissolved therein. The particles in the material 26 stripped of the surface active agent is returned via a conduit 37 to the separation tank 23 for reutilization as the carrier material while the solution 36 is collected in a reservoir 38. The solution 36 collected in the reservoir 38 is drawn by a pump 39 via a line conduit 40 for feed via the inlet conduit 15 into the reservoir 7 for recycling of the collected surface active agent.

Figure 2:
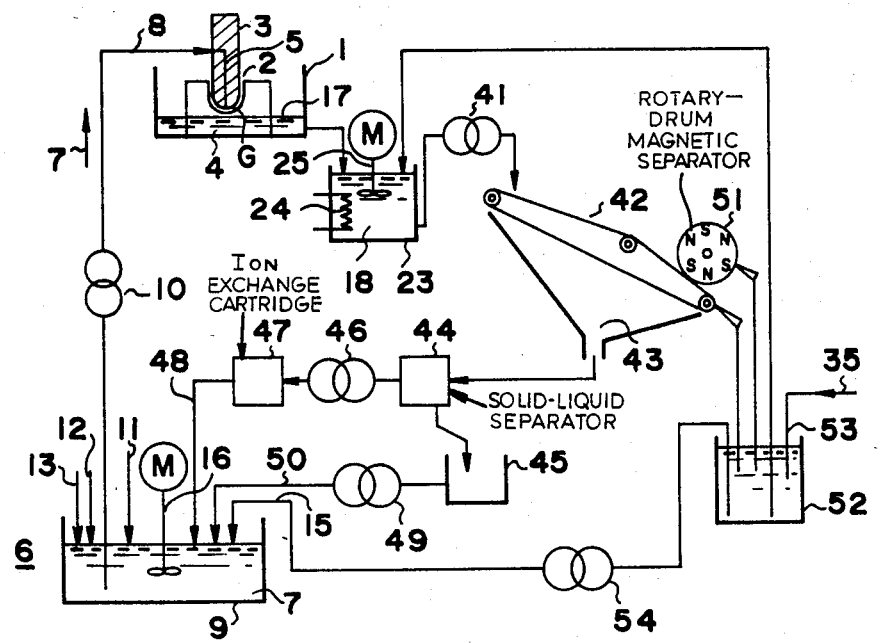
FIG. 2 is a similar view illustrating a modification of the embodiment shown in FIG. 1.

In the arrangement of FIG. 2, the machining liquid effluent 18 heated in the heating tank 23 is drawn by a pump 41 onto a moving porous conveyer 42 for separation and filtration. The filtered liquid which still contains fine iron particles is collected through a funnel 43 and fed into a solid-liquid separator 44. The separated iron particles are then collected in a receptacle 45 and the water component substantially freed from these particles is drawn by a pump 46 into and through an ion-exchange cartridge 47 to yield a deionized water having a specified resistivity which is fed into the reservoir 7 via an inlet conduit 48 for recycling. The iron particles collected in the receptacle 45 may be drawn by a pump 49 and thereby fed via a further conduit 50 for recycling.

On the other hand, a rotary-drum magnetic separator 51 is disposed in bearing contact with or adjacent to the moving conveyer 42 to magnetically attract the ferromagnetic carrier particles having the surface active agent deposited thereon. Scrapers are also provided to wipe off these particles attracted on the rotary-drum deparator 51 and remaining on the conveyer 42 respectively to feed them into a receptacle 52. The latter has an inlet conduit 53 for supplying thereto a pure water of a specified temperature and resistivity 35 so that the surface active agent on the carrier particles can be dissolved into the supplied water in the receptacle 52. The resulting solution is separated from the carrier particles in the receptacle 52 and drawn via a pump 54 to feed via the inlet conduit 15 into the reservoir 7 for recycling of the recovered surface active agent.

In the embodiments of FIGS. 1 and 2, it should be noted that the carrier material 26 either in the form of particles or a continuous body such as a mesh screen may not necessarily be drawn out of the separation tank 23. Thus, the liquid component separated by heating therein from the surface active agent depositing on the carrier material can be pumped out and thereby exhausted substantially therein for further treatment or disposal. Thereafter, cooled pure water of a specified resistivity and temperature is pumped into the separation tank 23 to allow the surface active agent collected on the carrier material 26 to be dissolved in the cooled pure water supplied to form a solution of the deionized water and the recovered surface active agent for return to the reservoir 7 for recycling.

Figure 3:
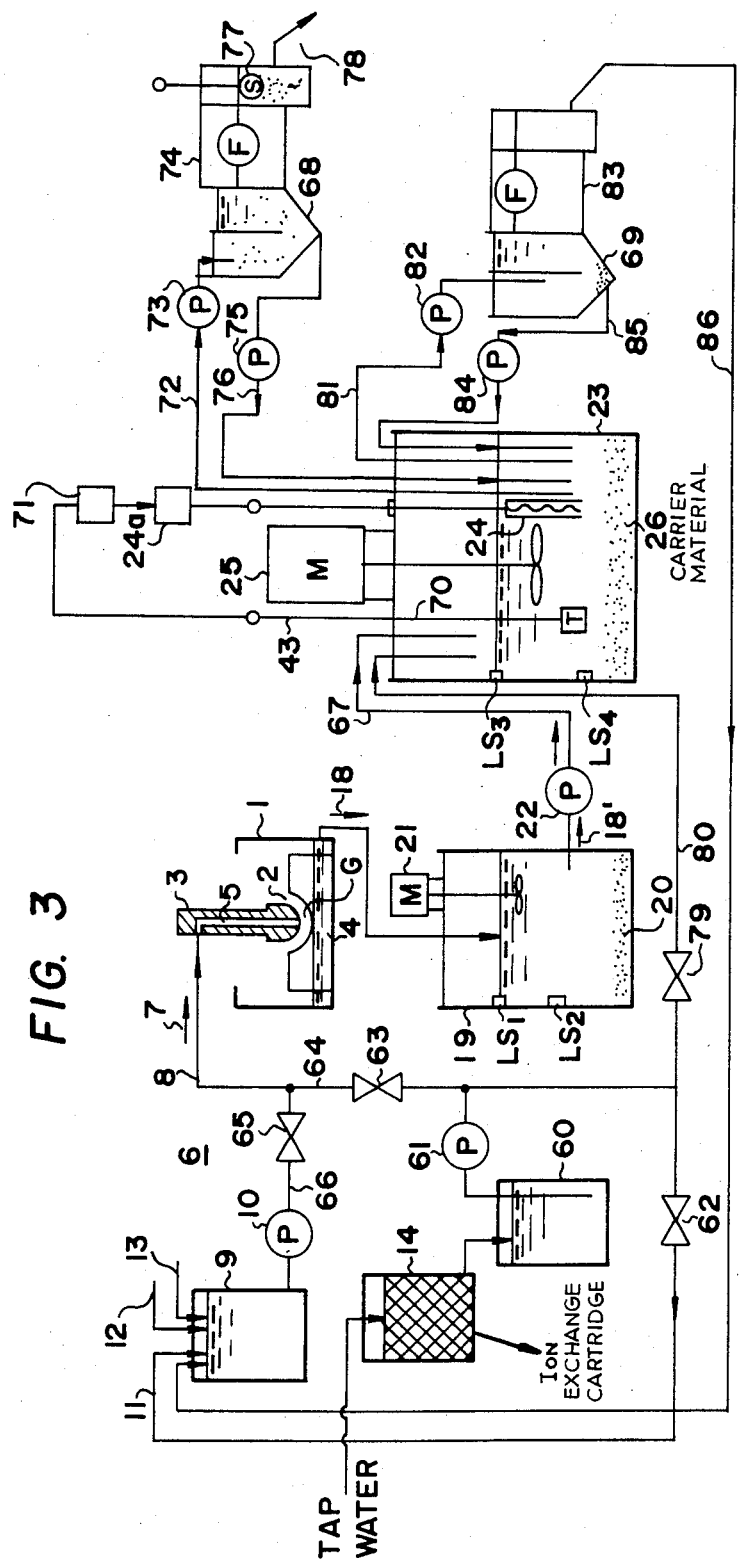
FIG. 3 is a similar view illustrating a further modification of the embodiments shown in FIGS. 1 and 2.

FIG. 3 shows an electrical machining system as generally shown in FIGS. 1 and 2 and already described, and somewhat detailed or modified with respect to certain features. In the arrangement of FIG. 3, the machining liquid source 6 is shown to include an additional reservoir 60 for receiving a deionized water from the ion-exchange cartridge 14 as already described. The deionized water in the reservoir 60 is drawn by a pump 61 so as to be led on the one hand into the reservoir 9 via a valve 62 along the conduit 11 and on the other hand into the inlet conduit 8 via a valve 63 along a conduit 64 to join with a flow of the liquid which is drawn by the pump 10 via a valve 65 along a line 66 to form the machining liquid 7 to be supplied into the machining zone 2.

The sedimentation tank 19 and the separation tank 23 already described can be provided with pairs of limit or level switches LS1, LS2; and LS3, LS4, respectively, to automatize the operation, this being shown in FIG. 3. Thus, when the machining liquid effluent 18 from the worktank 1 is accumulated in the sedimentation tank 19 and its rising surface level reaches the upper limit switch LS1 in the tank 19, the switch LS1 is turned on to activate the pump 22 to draw a clarified liquid 18' therein into the separation tank 23 via a line 67. Here, it is desirable that the separation tank 23 be constructed to have its volume which is equal to a fraction of the volume of the sedimentation tank 19. The pump 22 remains activated until the falling surface level of the liquid in the sedimentation tank 19 reaches the limit switch LS2 or the rinsing surface level of the liquid in the separation tank 23 reaches the limit switch LS3. Then in the separation tank 23, the agitator 25 and the heater 24 are actuated to commence agitation and heating of the liquid introduced therein in the presence of the carrier material 26 which is previously added at a volume proportion of, say, 20% and may be iron particles of a particle size of 3 microns. The liquid is agitated thoroughly within the tank 23 to move at a velocity of 0.5 meter/second. The liquid is heated to above a cloud point (e.g. 55° C.) thereof to separate therefrom an amount of the surface active agent as already described. A magnetic or electrostatic system as already described can be added to facilitate the separation. A liquid component separated from the surface active agent and thus constituted by the remainder of the machining liquid effluent is then fed on the one hand into a liquid separation tank 68 and on the other hand into a solid separation tank 69. The heating temperature within the separation tank 23 is maintained by means of a temperature-sensing probe 70 operated with a control circuit 70 for the power supply 24a of the heater 24.

The tank 23 is connected via a conduit 72 and a pump 73 with the tank 68. The pump 73 is operated to draw into the tank 68 the liquid component separated from the surface active agent in the tank 23. A solid component, e.g. iron particles as machining products and/or carrier material, entrapped in the liquid component is separated by gravity to settle in the tank 68 and, upon the operation of a pump 75, returned via conduit 76 to the tank 23 for reutilization therein. An oil component in the liquid is separated by a filter 74 and a clarified water component outgoing from the filter 74 is, upon sensing of its ionic concentration by a sensor 77, drained through an outlet 78 for disposal or return to the input reservoir 9 via the cnduit 11. The oil component collected in the filter 74 may be disposed of or, alternatively, returned to the reservoir 9 via the inlet 13.

The pump 73 continues to operate until the falling surface level of the liquid in the tank 23 reaches the limit switch LS4, i.e. until the liquid component in the separation tank 23 is substantially exhausted. The limit switch LS4 then deactuates the heater 24 and thereafter open a valve 79 to draw the deionized water in the reservoir 60 into the separation tank 23 via a conduit 80. The deionized water added into the tank 23 cools the carrier material 26 having the surface active agent deposited thereon. The surface active agent is thus dissolved into the added deionized water and forming a solution therewith. The pump 61 continues to operate until the rising surface level of the solution in the tank 23 reaches the limit switch LS3.

The tank 69 is used to filter the solution and is connected via a conduit 81 and a pump 82. When the rising surface of the solution in the tank 23 reaches the limit switch LS3, the pump 82 is operated to draw the solution into the tank 69 via the conduit 81. The solid component, e.g., iron particles as the carrier material and/or machining products, is separated by a filter 83 and, upon operation of a pump 84, is returned via a conduit 85 to the tank 26, and a clarified solution leaving the filter is returned to the reservoir 9 via a conduit 86. For example, a volume of the solution of 6 liters can be processed through the tank 69 for 30 minutes, thus at a rate of 200 cc/minute.

What is claimed is:

1. A method of processing a machining liquid in an electrical machining system, comprising the steps of:
    (a) forming an input machining liquid consisting at least in major part of an aqueous solution containing a non-ionic surface active agent dissolved in deionized water, said surface active agent having a temperature-dependent solubility in the solution and a cloud point of temperature below which it remains dissolved therein;
    (b) supplying said input machining liquid to an electrical machining zone whereby at least a volume portion of the supplied liquid serves as a medium for an electrical machining action therein;
    (c) feeding a liquid effluent from said machining zone, constituted by residual volume portions of said deionized water and said surface active agent remaining in the solution having electrical machining products entrapped therein, into a separation zone;
    (d) in said separation zone, heating said liquid effluent to, and maintaining it at, a temperature sufficiently above a said cloud point thereof to separate therefrom an amount of said surface active agent substantially in a solid form while forming a liquid constituted by at least a portion of the remainder of said liquid effluent; and
    (e) recycling said separated surface active agent at least as a portion of the surface active agent in said input machining liquid into a said electrical machining zone.

2. A method of processing a machining liquid in an electrical machining system, comprising the steps of:
    (a) forming an input machining liquid consisting at least in major part of an aqueous solution containing a surface active agent dissolved in deionized water, said surface active agent having a temperature-dependent solubility in the solution and a cloud point of temperature below which it remains dissolved therein;
    (b) supplying said input machining liquid to an electrical machining zone whereby at least a volume portion of the supplied liquid serves as a medium for an electrical machining action therein;
    (c) feeding a liquid effluent from said machining zone, constituted by residual volume portions of said deionized water and said surface active agent remaining in the solution having electrical machining products entrapped therein, into a separation zone;
    (d) in said separation zone, heating said liquid effluent to, and maintaining it at, a temperature above a said cloud point thereof to separate therefrom an amount of said surface active agent substantially in a solid form while forming a liquid constituted by at least a portion of the remainder of said liquid effluent;
    (e) treating the liquid formed in step (d) to form deionized water therefrom;
    (f) dissolving said separated surface active agent into said deionized water to form a solution thereof; and
    (g) recycling said solution formed in step (f) at least as a portion of said input machining liquid into a said electrical machining zone.

3. A method of processing a machining liquid in an electrical machining system, comprising the steps of:
   (a) forming an input machining liquid consisting at least in a major part of an aqueous solution containing a surface active agent dissolved in deionized water, said surface active agent having a temperature-dependent solubility in the solution and a cloud point of temperature below which it remains dissolved therein;
   (b) supplying said input machining liquid to an electrical machining zone whereby at least a volume portion of the supplied liquid serves as a medium for an electrical machining action therein;
   (c) feeding a liquid effluent from said machining zone, constituted by residual volume portions of said deionized water and said surface active agent remaining in the solution having electrical machining products entrapped therein, into a separation zone;
   (d) in said separation zone, heating said liquid effluent to, and maintaining it at, a temperature above a said cloud point thereof to separate therefrom an amount of said surface active agent substantially in a solid form while forming a liquid constituted by at least a portion of the remainder of said liquid effluent;
   (e) deionizing liquid formed in step (d); and
   (f) recycling the deionized liquid at least as a portion of said input machining liquid into said electrical machining zone.

4. A method of processing a machining liquid in an electrical machining system, comprising the steps of:
   (a) forming an input machining liquid consisting at least in a major part of an aqueous solution containing a surface active agent dissolved in deionized water, said surface active agent having a temperature-dependent solubility in the solution and a cloud point of temperature below which it remains dissolved therein;
   (b) supplying said input machining liquid to an electrical machining zone whereby at least a volume portion of the supplied liquid serves as a medium for an electrical machining action therein;
   (c) feeding a liquid effluent from said machining zone, constituted by residual volume portions of said deionized water and said surface active agent remaining in the solution having electrical machining products entrapped therein, into a separation zone;
   (d) in said separation zone, heating said liquid effluent to, and maintaining it at, a temperature above a said cloud point thereof to separate therefrom an amount of said surface active agent and said electrical machining products substantially in a solid form while forming a liquid constituted by at least a portion of the remainder of said liquid effluent; and
   (e) recovering said separated surface active agent and electrical machining products.

5. The method defined in claim 1 wherein in step (d) said amount of the surface active agent is collected substantially in solid form on a carrier material in said separation zone.

6. The method defined in claim 5 wherein said carrier material is in the form of a mesh screen.

7. The method defined in claim 2 wherein in step (d) said amount of the surface active agent is collected substantially in said solid form on a carrier material in said separation zone, in a further step said carrier material having said amount of the surface active agent deposited thereon is removed from said separation zone and collected, and in step (f) said separated surface active agent is dissolved by bringing said collected carrier material into contact with deionized water at least partly formed in step (e) to form said solution.

8. The method defined in claim 3 wherein in step (d) said amount of the surface active agent is collected substantially in solid form deposited on a carrier material in said separation zone and in step (f) said deionized water is recycled together with said collected surface active agent at least as a portion of said input machining liquid into said electrical machining zone.

9. The method defined in claim 3 wherein said separated surface active agent and electrical machining products are separately recovered in step (e).

10. The method defined in claim 5, further comprising the steps of collecting said carrier material having said amount of the surface active agent deposited thereon and bringing said collected carrier material into contact with a deionized water to dissolve said surface active agent therein to from a solution thereof.

11. The method defined in claim 10, further comprising recycling said solution at least as a portion of said input machining liquid into said electrical machining zone.

12. The method defined in claim 1, claim 2, claim 7, claim 3, claim 8, claim 4 or claim 9 wherein said liquid effluent from the electrical machining zone is, prior to feeding in step c) to the separation zone, subjected to a sedimentation step to allow at least a portion of said machining products to be separated therefrom.

13. The method defined in claim 12 wherein in the sedimentation step said portion of the machining products is separated from said liquid effluent by settling by gravity.

14. The method defined in claim 1, claim 2, claim 7, claim 3, claim 8, claim 4 or claim 9 wherein said liquid effluent is agitated while being heated in step (d).

15. The method defined in claim 5, claim 7, or claim 8 wherein said carrier material is in the form of solid particles.

16. The method defined in claim 5, claim 7 or claim 8 is applied through said separation zone to facilitate the separation of the surface active agent onto said carrier material.

17. The method defined in claim 15 wherein at least a portion of said particles is constituted by fine solid particles in said machining products contained in said liquid effluent introduced into the separation zone.

18. An electrical machining system, including:
   (a) means for forming an input machining liquid consisting at least in a major part of an aqueous solution containing a surface active agent dissolved in deionized water, said surface active agent having a temperature-dependent solubility in the solution and a cloud point of temperature below which it remains dissolved therein;
   (b) means for supplying said input machining liquid to an electrical machining zone whereby at least a volume portion of the supplied liquid serves as a medium for an electrical machining action therein;
   (c) means for feeding a liquid effluent from said machining zone, constituted by residual volume portions of said deionized water and said surface active agent remaining in the solution having electrical machining products entrapped therein, into a separation zone;
   (d) means disposed in said separation zone for heating said liquid effluent to, and maintaining it at, a temperature above a said cloud point thereof to separate therefrom an amount of said surface active agent substantially in a solid form while forming a liquid constituted by at least a portion of the remainder of said liquid effluent; and (e) means for feeding said separated surface active agent to means (a) so as to be recycled at least as a portion of said input machining liquid by means (b) into a said electrical machining zone.

19. The system defined in claim 18, further comprising sedimentation means arranged to allow at least a portion of said machining products to be separated therefrom, said sedimentation means being located upstream of said means (d) for heating said liquid effluent.

20. The system defined in claim 18 or claim 19 wherein said separation zone comprises a mesh screen defining a carrier material for collecting said amount of the surface active agent.

21. The system defined in claim 18 or claim 19 wherein said separation zone is arranged to comprise carrier material in the form of solid particles for collecting said amount of the surface active agent and means for applying a magnetic field to said material to facilitate the separation of the surface active agent onto said material.

22. The system defined in claim 21, further comprising means for collecting said carrier material having said amount of the surface active agent deposited thereon and for bringing said collected carrier material into contact with deionized water for dissolving said surface active agent therein to form a solution thereof.

23. The system defined in claim 22, further comprising means for recycling said solution at least as a portion of said input machining liquid into said electrical machining zone.

24. An electrical machining system, including:
(a) means for forming an input machining liquid consisting at least in a major part of an aqueous solution containing a surface active agent dissolved in deionized water, said surface active agent having a temperature-dependent solubility in the solution and a cloud point of temperature below which it remains dissolved therein;
(b) means for supplying said input machining liquid to an electrical machining zone whereby at least a volume portion of the supplied liquid serves as a medium for an electrical machining action therein;
(c) means for feeding a liquid effluent from said machining zone, constituted by residual volume portions of said deionized water and said surface active agent remaining in the solution having electrical machining products entrapped therein, into a separation zone;
(d) means disposed in said separation zone for heating said liquid effluent to, and maintaining it at, a temperature above a said cloud point thereof to separate therefrom an amount of said surface active agent substantially in a solid form while forming a liquid constituted by at least a portion of remainder of said liquid effluent;
(e) means for treating the liquid formed in said separation zone to form deionized water therefrom;
(f) means for dissolving said separated surface active agent into the deionized water formed by said means (e) to form a solution thereof; and
(g) means for feeding said solution formed by said means (f) to means (a) so as to be recycled at least as a portion of said input machining liquid by means (b) into a said electrical machining zone.

25. An electrical machining system, including:
(a) means for forming an input machining liquid consisting at least in a major part of an aqueous solution containing a surface active agent dissolved in deionized water, said surface active agent having a temperature-dependent solubility in the solution and a cloud point of temperature below which it remains dissolved therein;
(b) means for supplying said input machining liquid to an electrical machining zone whereby at least a volume portion of the supplied liquid serves as a medium for an electrical machining action therein;
(c) means for feeding a liquid effluent from said machining zone, constituted by residual volume portions of said deionized water and said surface active agent remaining in the solution having electrical machining products entrapped therein, into a separation zone;
(d) means disposed in said separation zone for heating said liquid effluent to, and maintaining it at, a temperature above a said cloud point thereof to separate therefrom an amount of said surface active agent substantially in a solid form while forming a liquid constituted by at least a portion of the remainder of said liquid effluent;
(e) means deionizing the liquid formed in said separation zone; and
(f) means for feeding said deionized liquid to means (a) so as to be recycled at least as a portion of said input machining liquid by means (b) into a said electrical machining zone.

26. An electrical machining system, including:
means for forming an input machining liquid consisting at least in a major part of an aqueous solution containing a surface active agent dissolved in deionized water, said surface active agent having a temperature-dependent solubility in the solution and a cloud point of temperature below which it remains dissolved therein;
means for supplying said input machining liquid to an electrical machining zone whereby at least a volume portion of the supplied liquid serves as a medium for an electrical machining action therein;
means for feeding a liquid effluent from said machining zone, constituted by residual volume portions of said deionized water and said surface active agent remaining in the solution having electrical machining products entrapped therein, into a separation zone;
means disposed in said separation zone for heating said liquid effluent to, and maintaining it at, a temperature above a said cloud point thereof to separate therefrom an amount of said surface active agent substantially in a solid form while forming a liquid constituted by at least a portion of the remainder of said liquid effluent; and
means for recovering said separated surface active agent and electrical machining products from said separation zone.

27. The system defined in claim 26, further comprising means for separating said recovered surface active agent from said recovered electrical machining products.

* * * * *